United States Patent [19]
Tobish

[11] Patent Number: 5,444,775
[45] Date of Patent: Aug. 22, 1995

[54] TELEPHONE KEY SELECTION AID

[76] Inventor: John J. Tobish, 1052 Earl St., St. Paul, Minn. 55106

[21] Appl. No.: 150,386

[22] Filed: Nov. 9, 1993

[51] Int. Cl.$^6$ ............................................. H04M 1/26
[52] U.S. Cl. ..................... 379/368; 379/362; 379/456; 379/369
[58] Field of Search ............... 379/362, 433, 368, 369, 379/370, 363, 364, 367, 456

[56] References Cited

U.S. PATENT DOCUMENTS

| | | | |
|---|---|---|---|
| 1,694,429 | 8/1927 | Peak | 379/456 |
| 2,836,661 | 5/1958 | Will | 379/456 X |
| 4,012,127 | 3/1977 | Bolander | 379/368 X |
| 4,119,809 | 10/1978 | Bianchini | 379/456 X |

FOREIGN PATENT DOCUMENTS

3022877 12/1981 Germany ............... 379/456

Primary Examiner—Jeffery A. Hofsass
Assistant Examiner—Magdy W. Shehata
Attorney, Agent, or Firm—D. L. Tschida

[57] ABSTRACT

A locator aid for identifying and permitting the actuation of the number "9" and "1" keys of a rotary or touch telephone keyboard. Each locator includes a base which is fixedly positioned with respect to the telephone, an elongated guide strip, and an intermediate hinge connection between the base and the guide strip. Each base is positioned with respect to the telephone so its guide strip will lie in spaced relation to a finger hole of a rotary dial or in overlying relation to one of the keys of a keyboard. In a preferred construction the locator is constructed of a die cut plastic strip and includes multiple, bendable hinge joints and an adhesive fastener, which permits selective attachment of the locator to a phone body. In other constructions, the locator is integrally molded as an selectively attachable member or is molded as part of the keyboard.

14 Claims, 10 Drawing Sheets

TELEPHONE KEY SELECTION AID

BACKGROUND OF THE INVENTION

1. Field of the Invention

The present invention relates generally to apparatus which serves as a non-visual aid in locating significant finger holes of a rotary telephone dialer or keys of a manually depressible keyboard.

2. Description of the Prior Art

In the telephone field, many telephones utilize a rotary dialer or a keyboard which includes a number of pressure activated keys. Some telephones also utilize a keyboard with outwardly facing proximity or heat actuated keys or domains which require no digital movement of the key or domain, but merely the presence of a finger on or in proximity to the key/domain. However, none of these dialers or keyboards are readily usable when the user's vision is impaired by physical or environmental limitations.

Because the finger holes and keys of most telephones are spaced fairly close together, it is impossible or extremely difficult for visually or physically impaired users or users experiencing stressful conditions to successfully activate the telephone. Many times, the wrong keys are struck or keys are missed.

These problems can be further aggravated in times of emergency, when the user is operating under stressful conditions. Under these conditions, attempting to enter the emergency numbers "9-1-1" can become time consuming or even fatal.

SUMMARY OF THE INVENTION

This invention presents a nonvisual key location and selection aid which allows designated keys or domains to be readily identified and actuated even though they are not visible.

The key selection aid of the present invention includes at least one resilient locator mechanism having a base, an elongated guide strip and connecting means between the base and the guide strip. The locator mechanism fixedly mounts to a standard telephone having a body and a rotary dialer or a keyboard with numbered, pressure or proximity actuated keys projecting outwardly from the body, such that the guide strips can project adjacent to or through a finger hole or at least partially over a designated key.

With the adoption of the universal telephone number "9-1-1" to obtain emergency assistance, two locator mechanisms can be utilized, one attached to the telephone in alignment with the key numbered "9" and the other attached in alignment with the key numbered "1". The guide strips are of sufficient length and are formable and positionable so that an unseeing individual attempting to enter "9-1-1" can readily identify the guide strips by touch. In a keyboard compatible form of the invention, once identified, the guide strips are pressed into engagement with the keys with which they are aligned in the appropriate order to signal "9-1-1".

Because the locator mechanism is resilient, normal use of the telephone dialer or keyboard is not impaired. One or more of the locator mechanisms can alternatively be positioned in alignment with other keys on the telephone for entering numbers other than "9-1-1". This will be particularly helpful in telephone systems utilizing speed dialing where an invalid, for example, need depress but a single key to obtain assistance.

DESCRIPTION OF THE PREFERRED EMBODIMENTS

Figure 1:
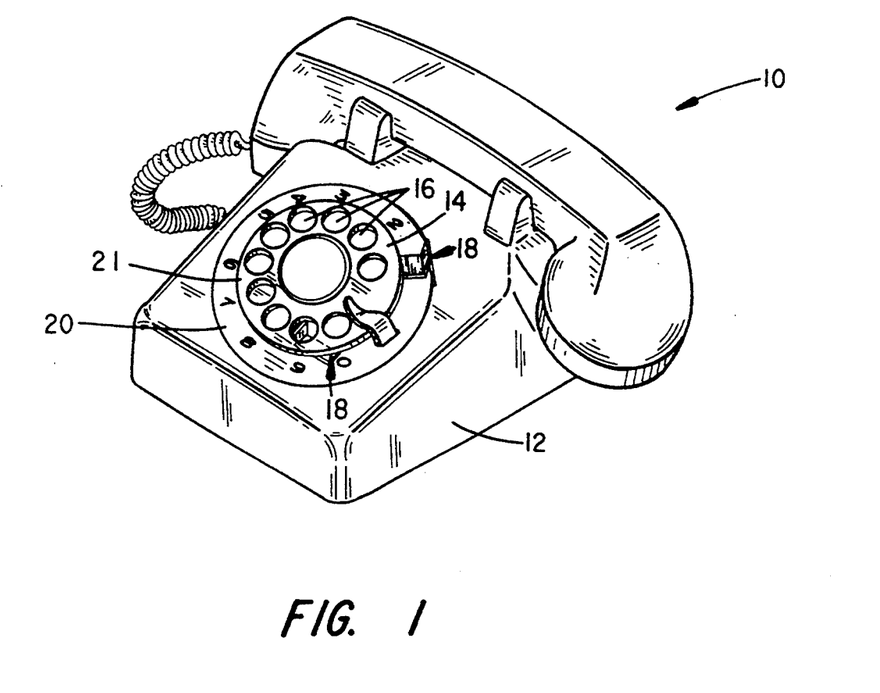
FIG. 1 is a perspective view of a rotary telephone with a first embodiment of the key locator aid of the present invention installed thereon.

FIG. 1 discloses a standard rotary desk telephone 10, such as are used with pulse phone lines, and to which a first embodiment of the invention is attached. The telephone has a body 12 which includes a rotary dial assembly 14 that contains a number of finger holes 16 at a rotating dial 21. Each finger hole 16 is aligned with a unique numerically identified location or indicia from "0" to "9". The indicia are typically primed along the outer circumference of a stationary dial base 20.

A pair of locator aids 18 of the invention project from the body 12 in relation to the finger holes 16 associated with the "9" and "1" digit locations. One of the locators 18 is mounted adjacent to a selected finger hole 16 and the other is mounted to project through a finger hole 16. The mountng location can be varied as well as the manner of attaching the locators 18 to the body 12. Depending upon the mounting location, the locator 18 can be bent to different shapes, some of which are depicted and discussed below.

Preferably, the locators 18 are mounted in relation to the finger holes 16 in a manner that permits the user to identify the unique digit by touch, without having to visually see the digits. Each locator 18 is flexible and is typically mounted about the circumference of the stationary dial 20, either adjacent to or through the finger holes 16. If mounted through a finger hole 16, the locator 18 flexes as the dial 21 rotates. With the return of the dial 21 to its normal rest position, the locator 18 springs back into alignment with the selected finger hole 16.

Figure 2:
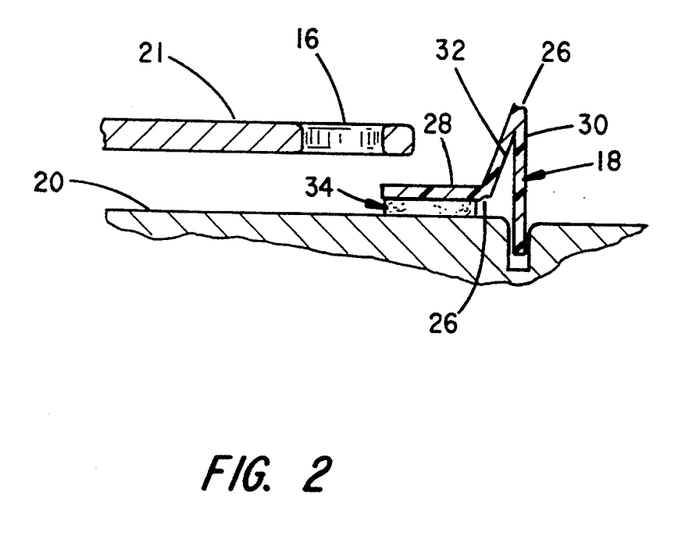
FIG. 2 is a cross section view of the mounting of a locator to the side of the dialer.
Figure 3:
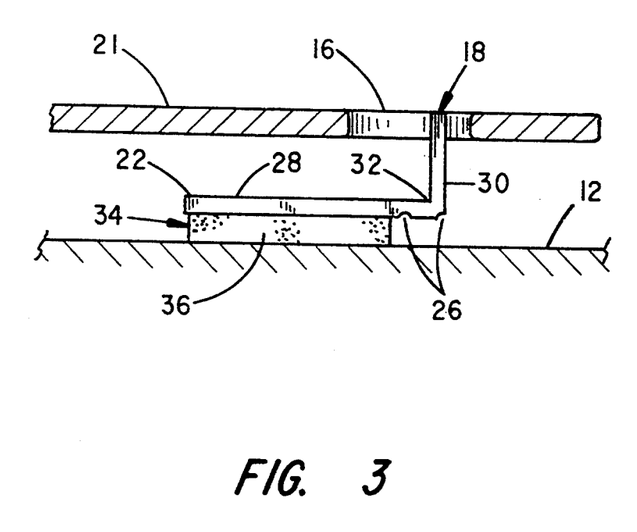
FIG. 3 is a cross section view of the mounting of a locator through a finger hole of the telephone of FIG. 1.
Figure 4:
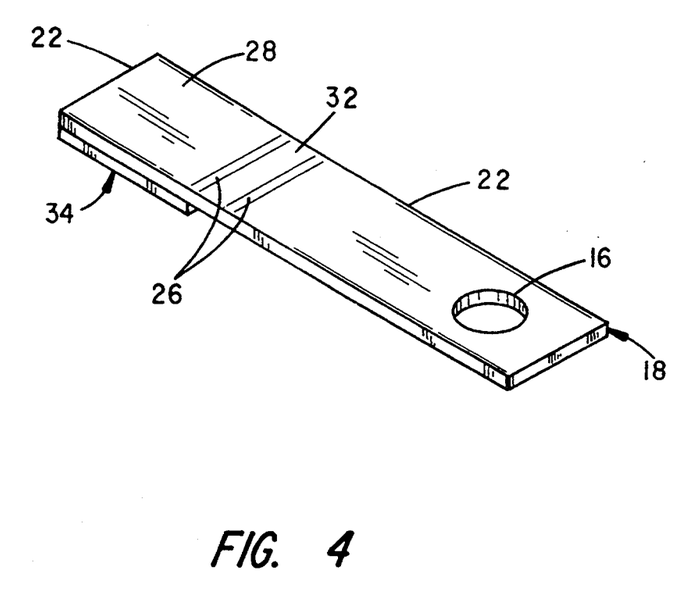
FIG. 4 is a perspective view of a die cut and scored locator aid.

FIG. 2 depicts a cross section view of the mounting of the locator 18 adjacent one of the finger holes 16. FIG. 3 discloses a cross section view through one of the finger holes 16. FIG. 4, in turn, depicts a perspective view of the locator 18, before it is bent to shape and attached to the dial 20.

The locator aid 18 is constructed of a durable, die cut plastic or other suitably resilient material which is selected to accomodate the intended use. The exposed surface of the material is selected to accomodate screen printing or alternatively can support separately attached printed text or graphics. The material may also be colored or made phosphorescent to be visible in normal or low light conditions. In some constructions, minature battery powered electronics might be included to illuminate each locator.

In a preferred form, the plastic material is cut to form a blank 22 having a rectangular shape approximately ⅜×1½ inches. The blank 22 can include raised or embossed indicia to facilitate identification of a finger hole 16 or key. An aperture 24 is particularly provided at one end which mounts in alignment with a selected key, and the advantages of which will become more apparent below from the discussion of FIGS. 5 through 10. As desired, the blank 22 can be shortened or shaped by the user with the use of a scissors.

Figure 9:
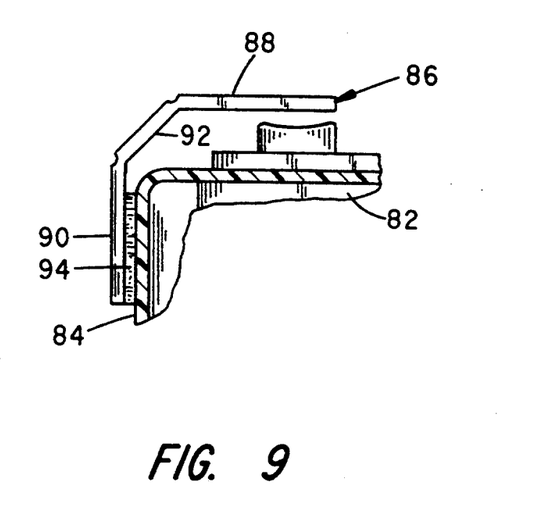
FIG. 9 is an enlarged section view taken along section line 9 of FIG. 8 through one of the die cut/scribed locator aids.

A pair of recessed scribe lines 26 are formed into the blank 22 to create a pair of selectable, living hinges which facilitate bending the blank 22 to fit a particular phone mounting. The number, depth and shape of the scribe lines 26 can be adjusted to provide preferrential angular bends, for example, bends of 45, 90 or 180 degrees relative to the phone are shown at FIGS. 2, 3 and 9. Depending upon the phone construction, one or more bends are required, and the number can be established to accomodate a range of phone applications.

Preferrably, the material is selected to have a memory such that, once bent, the blank 22 retains its shape over time. Under normal use, the locators 18 are added as after-market attachments to a telephone by the user. FIGS. 1, 2, 3, and 5 and to 9 depict typical alternative mountings of the locator 18 for rotary and touch phones.

With the bending of the blank 22 to form, a base portion 28 is defined which is secured to the phone body 12 and a guide strip 30 is defined which aligns with the hole 16 or key. The length of the guide strip will depend upon which scribe line or lines 26 are selected for purposes of making necessary bends. An intermediate hinge region 32 of variable length is correspondingly defined with the bending of the blank 22. Depending upon which scribe line or lines 26 are bent, the length of the guide strips 30 of the locators 18 mounted at the "1" and "9" finger holes 16 of FIG. 1 can be set to differing lengths to facilitate identification of the two locations.

The base 28 of the locator 18 is secured to the phone body 12 via a multi-sided adhesive tape 34 which is compatible with the mounting surface. Depending upon the mounting surface and/or degree of resilience desired at the hinge point closest to the phone body 12, the adhesive surfaces of the tape can be separated by an intervening substrate 36 of foam or paper. A thicker substrate 36 provides a degree of elevation to the blank 22 which facilitates the hinge action at the scribe line 26 closest the phone body 12.

Figure 5:
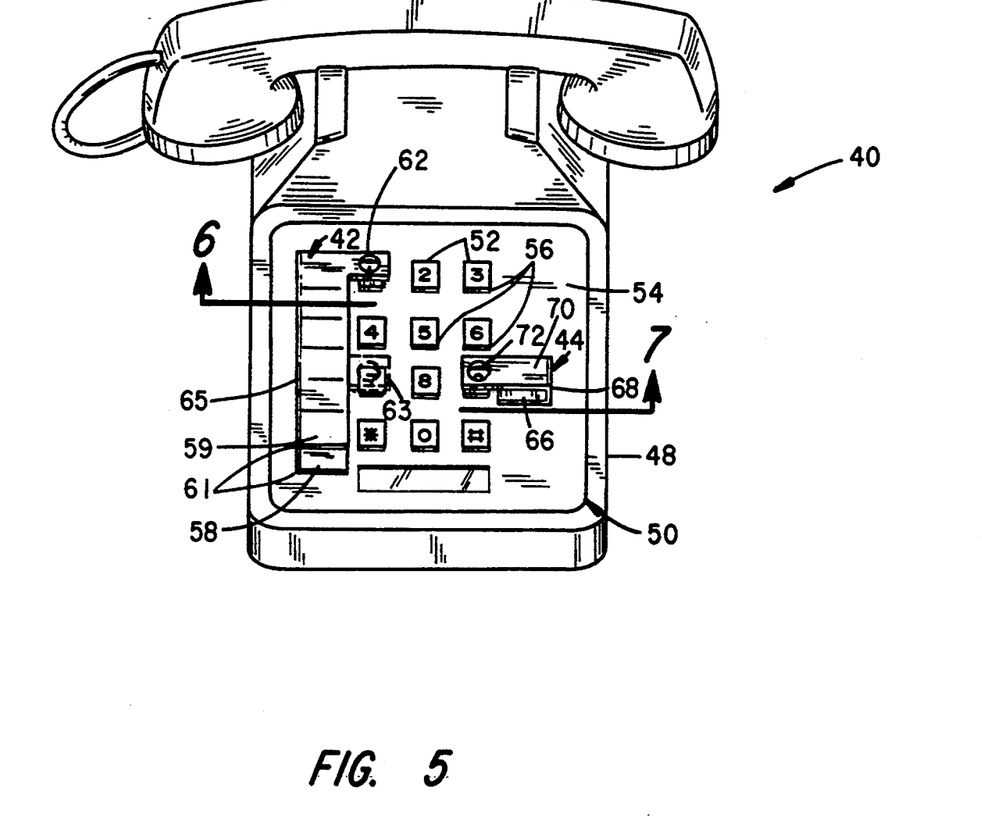
FIG. 5 is a perspective view of a touch telephone containing alternative embodiments of die cut/scribed and molded key locator aids of the invention installed on a touch keyboard.

FIG. 5 discloses a touch type desk telephone 40 and to which a pair of alternative locators 42 and 44 are attached. The construction of the locators 42, 44 are separately discussed below. In lieu of a rotary dial 21, the telephone 40 provides a housing 48 that includes a keyboard 50 and through which a number of pressure actuated keys 52 project. A cover plate 54 particularly supports the keys 52 of the keyboard 50 to project through a number of apertures 56.

Figure 6:
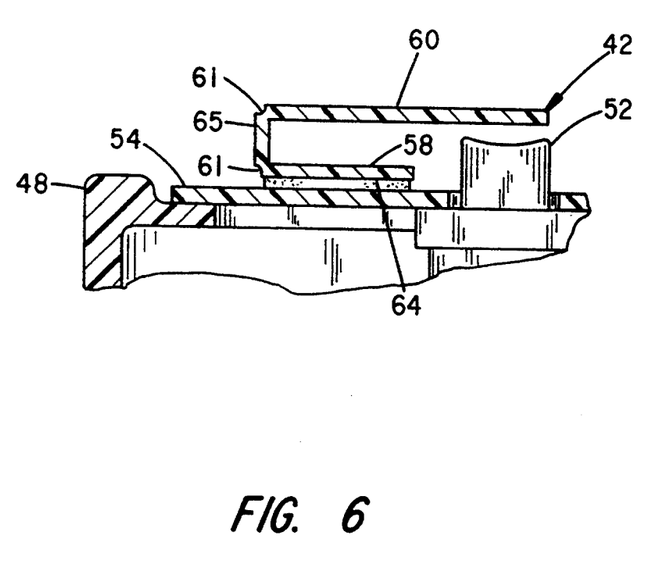
FIG. 6 is an enlarged cross sectional view taken along the section line 6 of FIG. 5 of the die cut/scribed locator aid.

The locator 42, which is shown in cross section at FIG. 6, is constructed to be substantially similar to the locator 18. The base portion 58 however is elongated to provide a surface area 59 which can include promotional text and graphics. A guide strip 60 projects from the side of the base 58 and scribe lines 61 are provided to permit the bending and alignment of the strip 60 with the "1" key. The numeral of the lower lying key 52 is visible through an aperture 62 in the strip 60.

Depending upon the application, additional guide strips can extend from the base 58. One such strip 63 is shown in dashed line. The strips 60, 63 and associated keys 52 can be distinguished from each other by constructing the strips to differing widths or possibly by forming user identifiable raised indicia, apertures or depressions into the strips 60, 63.

A foamed adhesive backing tape 64 secures the base 58 to the phone. Scribe lines 61 are established in the locator 42 to permit a vertical separation or offset at the hinge 65 which appropriately spaces the guide strip 60 above the adjacent key 52. Although only two scribe lines 61 are shown, it is to be appreciated additional lines 61 can be provided to accomodate the fitting of the locator 42 to keyboards 50 depending upon the available space and physical structure of the keys 52.

Figure 7:
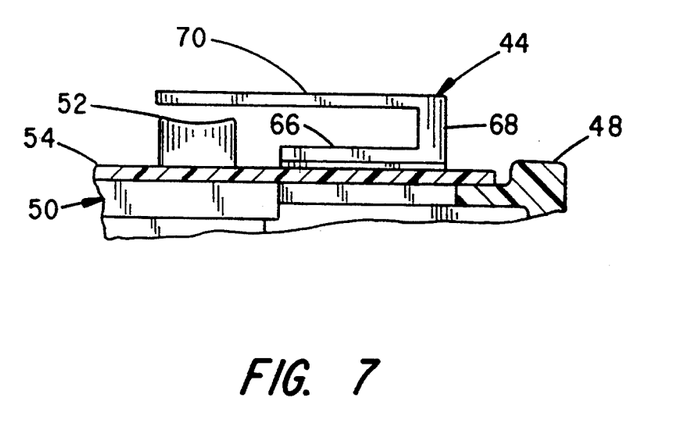
FIG. 7 is an enlarged cross sectional view taken along the section line 7 of FIG. 5 of the molded locator aid.

The locator 44, which is shown in cross section at FIG. 7, is constructed as an integrally molded assembly. The locator 44 is injection molded from a suitably resilient plastic to provide an integral base 66, offset hinge 68 and guide strip 70. An aperture 72 is formed in the guide strip 70 to permit viewing of the "9" digit. The standoff provided by the hinge 68 is sized to permit the guide strip 70 to mount above the key 52.

In normal use, if a user is attempting to key "9-1-1" on the phone 40, the user sequentially locates and distinguishes the locators 44 and 42 by tactile touch. The locators 44 and 42, respectively corresponding to the "9" and "1" keys, in turn, are appropriately depressed.

The locator mechanisms 42, 44 are of sufficient size such that the telephone user is able to identify them and their relative position with respect to the keyboard 50 by touch. Each locator mechanism 42, 44 is resilient and able to flex with finger depression to permit activation of the lowerlying keys 52. Once each locator is sequentially located, the guide strips 60, 63, and 70 are depressed to contact and depress their aligned keys 52, which causes the transmission of a desired signal.

To achieve the advantages and desired resilience, which enables prolonged use, the material and/or portions of the locators 42, 44 may be modified. For example although a unitary construction is presently preferred, a composite construction made of differing materials may provide advantages. The thickness of the entire length or selected portions of each guide strip might also be tailored alone or in combination with changes to the size, spacing and manner of forming the scribe lines to vary the feel and resilience of the guide strip and/or hinge. It is to be appreciated still other modifications might be considered by those skilled in the art.

Figure 8:
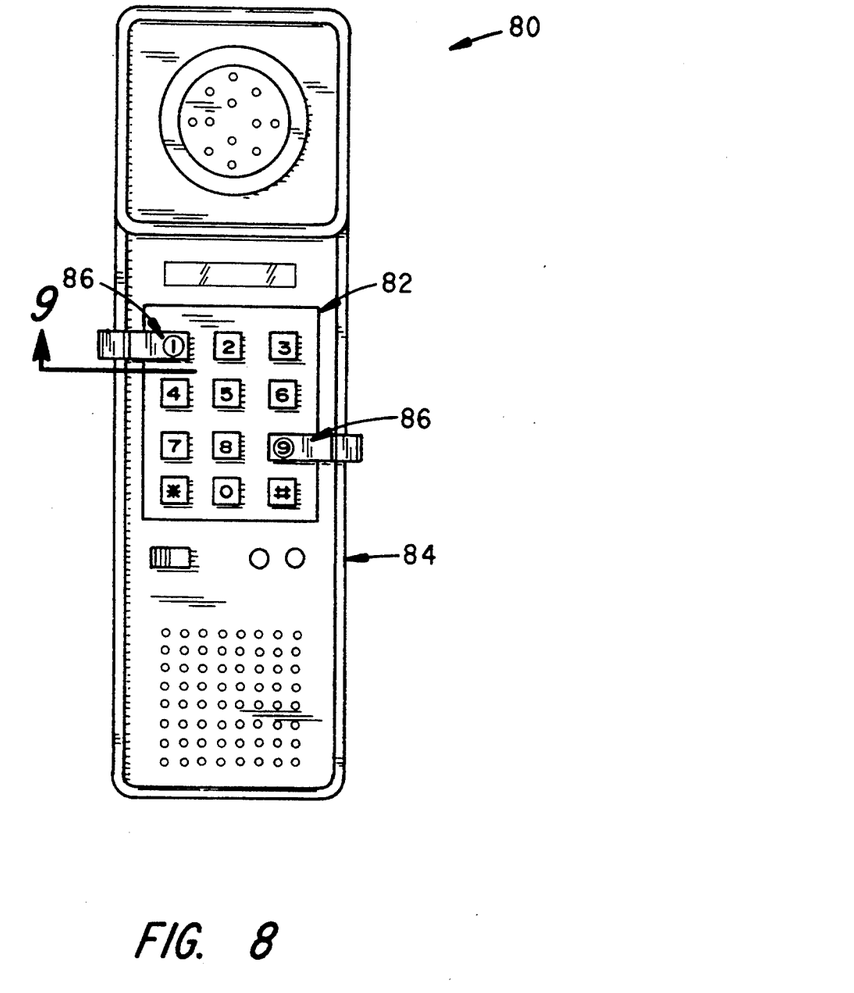
FIG. 8 is a plan view of a second form of telephone containing die cut/scribed locators.

Referring to FIGS. 8 and 9, a phone 80 is shown having a keyboard 82 built into the handset 84. A pair of resilient locators 86 are secured to the side of the handset 84. The locators 86 are substantially similar to the locator 18. Each locator includes a guide strip 88, base 90 and a connecting hinge 92. The base 90 of each locator 86 is attached to the side of the telephone handset 84 with a double sided adhesive pad 94, or some other suitable mounting mechanism.

Figure 10:
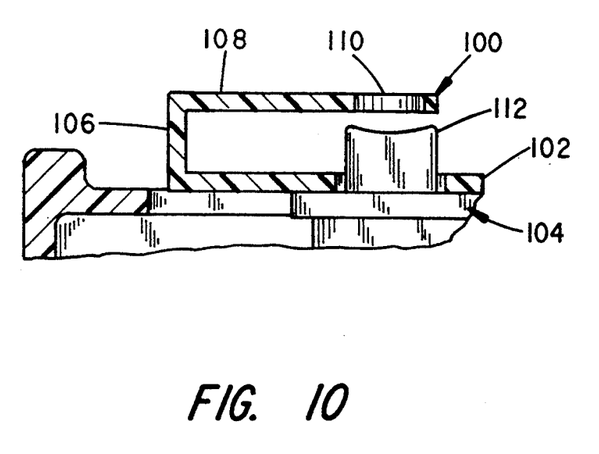
FIG. 10 is a cross section view of a keyboard containing an integrally molded locator.

FIG. 10 lastly discloses a construction of the invention where a resilient locator 100 is integrally constructed as part of a cover plate 102 of a keyboard 104. The base of the locator 100 is integrally molded with the cover plate 102. A hinge connector 106 projects from the plate 102 and a guide strip 108 having an aperture 110 projects above a key 112. The strip 108 can be shortened to expose the key 112.

The key locators of the present invention may be used to dial numbers other than "9-1-1". As an example, many telephone systems have speed dialing, which allow the user to program the telephone to dial a particular number by only pressing a relatively few keys. By placing appropriate key locators adjacent those particular keys, the user may easily call a precoded number even when the keys on the telephone keyboard are not visibly distinguishable.

While the invention has been described with respect to particularly preferred constructions and various modifications and improvements thereto, still other modifications and changes may become apparent to those skilled in the art. The invention should therefore not be strictly interpreted to the foregoing description but should be interpreted to include all those equivalent embodiments within the spirit and scope of the following claims.

What is claimed is:

1. A tactile selection aid for a telephone, comprising:
   a) a base, a guide strip and a plurality of recesses formed into an elongated body intermediate the base and the guide strip, wherein said body is bent at ones of said recesses to direct said guide strip to project from said base at a selected angular orientation and permit said guide strip to flex; and
   b) adhesive means for affixing the base to a stationary body of the telephone and directing the guide strip to align to a selected one of a plurality of moveable actuators of said telephone without interfering with the operation of any of said actuators and such that upon depressing the guide strip by a user's finger, the selected actuator is contacted by the guide strip, where by the actuator can be actuated with further pressure to the guide strip.

2. Apparatus as set forth in claim 1 wherein the adhesive means comprises a tape having a substrate coated with an adhesive on upper and lower surfaces.

3. Apparatus as set forth in claim 2 wherein the substrate comprises a foam member.

4. Apparatus as set forth in claim 1 wherein said guide strip includes a tactile indicia which is alignable over a top surface of said selected one of said plurality of moveable actuators.

5. Apparatus as set forth in claim 4 wherein said indicia comprises an aperture which is alignable over said top surface of said selected one of said plurality of moveable actuators.

6. Apparatus as set forth in claim 1 wherein said base is a common base to a plurality of other guide strips and elongated bodies, and wherein each of said plurality of elongated bodies is bent at other plurality of recesses to flexibly project from said base and align with one of the others of said plurality of moveable actuators without interfering with the operation of any of said moveable actuators.

7. A key selection aid for a telephone, comprising:
   a) a body having a base, a guide strip0 and hinge means integrally coupling said base to said guide strip, such that said guide strip flexibly projects from said base; and
   b) means for affixing the base to a stationary body of the telephone and directing the guide strip to align to a selected one of a plurality of depressible keys of said telephone without interfering with the operation of any of said keys and such that upon depressing the guide strip by a user's finger, the guide strip flexes and the selected key is contacted by the guide strip, whereby the key can be actuated with further pressure to the guide strip.

8. Apparatus as set forth in claim 7 wherein said base includes a plurality of other guide strips, and wherein each of said plurality of guide strips is hinged to flexibly project from said base and align with one of the others of said plurality of keys without interfering with the operation of any of said keys.

9. Apparatus as set forth in claim 7 wherein said guide strip includes a tactile indicia which is alignable over a top surface of one of said selected one of said plurality of depressible keys.

10. Apparatus as set forth in claim 7 wherein said body is constituted as a keyboard cover plate.

11. A tactile selection aid for a telephone, comprising:
    a) an elongated body having a base, a guide strip and a plurality of recesses formed into the body intermediate the base and guide strip, wherein said guide strip includes a tactile indicia, and wherein said body is bent at ones of said recesses to direct said guide strip to project from said base at a selected angular orientation, yet permit said guide strip to flex; and
    b) adhesive means having a resilient substrate for affixing the base to a stationary body of said telephone and directing the guide strip and indicia to overlie a selected one of a plurality of keys of said telephone without interfering with the operation of any of said keys and such that upon depressing the guide strip by a user's finger, the guide strip flexes and the selected key is contacted by the guide strip, whereby the key can be actuated with further pressure to the guide strip.

12. Apparatus as set forth in claim 11 wherein said resilient substrate comprises a foam member having first and second adhesive surfaces and wherein said first surface is affixed to said base and the second adhesive surface attaches to the stationary body of said telephone.

13. A tactile selection aid for a telephone, comprising:
    a) a base, a guide strip and a plurality of recesses formed into an elongated body intermediate the base and the guide strip, wherein said guide strip includes an aperture, and wherein said body is bent at ones of said recesses to direct said guide strip to project from said base at a selected angular orientation and permit said guide strip to flex; and
    b) a foam substrate having first and second adhesive surfaces, wherein said first surface is secured to said base and said second surface attaches to the stationary body of the telephone to direct the guide strip to overly a selected one of a plurality of keys of said telephone without interfering with the operation any of said keys, wherein the guide strip mounts with the aperture aligned to an underlying printed indicia of the selected key and such that upon depressing the guide strip by a user's finger, the guide strip flexes and the selected key is contacted by the guide strip, whereby the key can be actuated with further pressure to the guide strip.

14. Apparatus as set forth in claim 13 wherein said base is a common base to a plurality of other guide strips and elongated bodies, and wherein each of said plurality of elongated bodies is bent at other plurality of recesses to flexibly project from said base and align with one of the others of said keys without interfering with the operation of any of said keys.

* * * * *